Sept. 5, 1933.  H. J. NELSON  1,925,565
FILM PACKAGE
Filed July 28, 1931  2 Sheets-Sheet 1

Inventor:
Homer J. Nelson,
By Newton M Ferris
Donald H. Stewart.
Attorneys

Sept. 5, 1933.  H. J. NELSON  1,925,565
FILM PACKAGE
Filed July 28, 1931   2 Sheets-Sheet 2
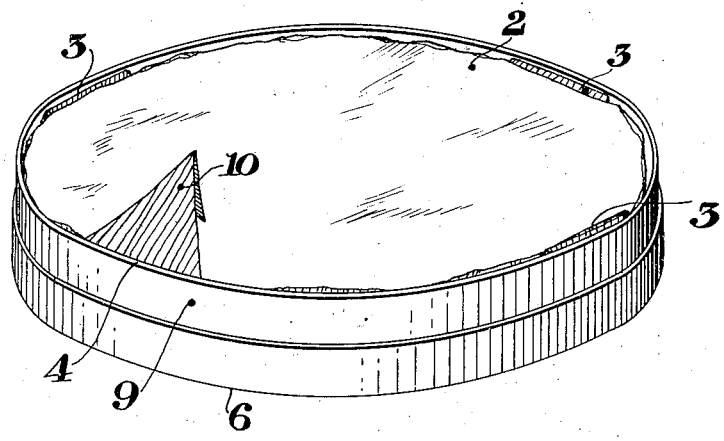
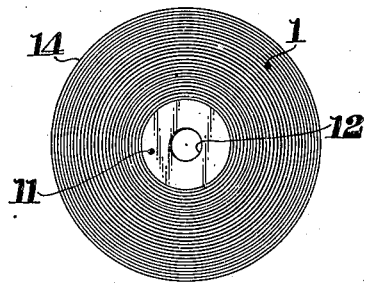
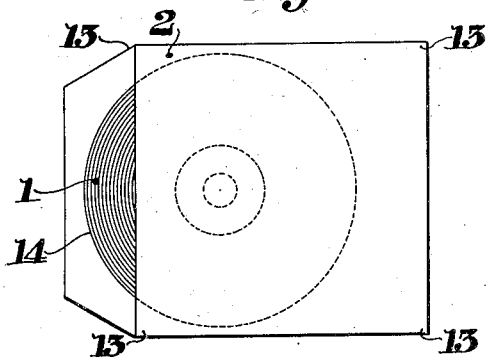
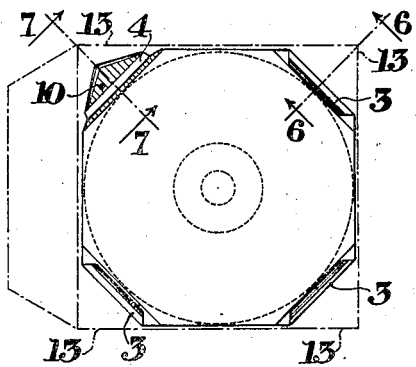
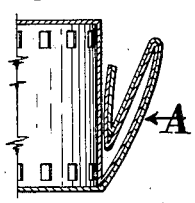
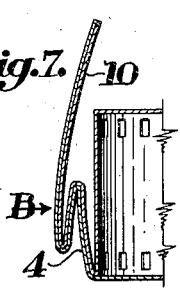
Inventor:
Homer J. Nelson,
By
Attorneys Patented Sept. 5, 1933

1,925,565

UNITED STATES PATENT OFFICE 1,925,565

FILM PACKAGE

Homer J. Nelson, Rochester, N. Y., assignor to Eastman Kodak Company, Rochester, N. Y., a corporation of New York Application July 28, 1931. Serial No. 553,522

4 Claims. (Cl. 206—52)

This invention relates to photography and more particularly to packages of photographic film. One object of my invention is to provide a photographic film package which will adequately protect the film against abrasion and friction markings and which is comparatively inexpensive. Another object of my invention is to provide a package for photographic coiled film in which the convolutions of film are firmly held together in their original shape. Another object of my invention is to provide a film package in which shock absorbing members are placed between the outside container and the coil of film. Still another object of my invention is to provide a film package which can be made with considerable speed and which does not require great accuracy of workmanship. Another object of my invention is to provide a film package in which a suitable handle is provided for the easy removal of the film from a protective covering. Another object of my invention is to provide a film package which will protect the film from light and which is not destroyed by opening the package to remove a length of film from the coil and other objects will appear from the following specification, the novel features being particularly pointed out in the claims at the end thereof.

In the drawings wherein like characters denote like parts throughout:

Fig. 2 is a perspective view of the wrapped film inserted in the lower portion of a protective can with the cover removed;

Fig. 3 is a top plan view of a long coil of motion picture film ready to be wrapped;

Fig. 4 is a top plan view of the film shown in Fig. 3 partially inserted into a light protecting envelope;

Fig. 5 is a plan view showing the coil of film completely in the envelope with the corners of the package formed into a series of folds which results in shock absorbing portions;

Fig. 6 is a section on line 6—6 of Fig. 5 and Fig. 7 is a section on line 7—7 of Fig. 5.

Figure 1:
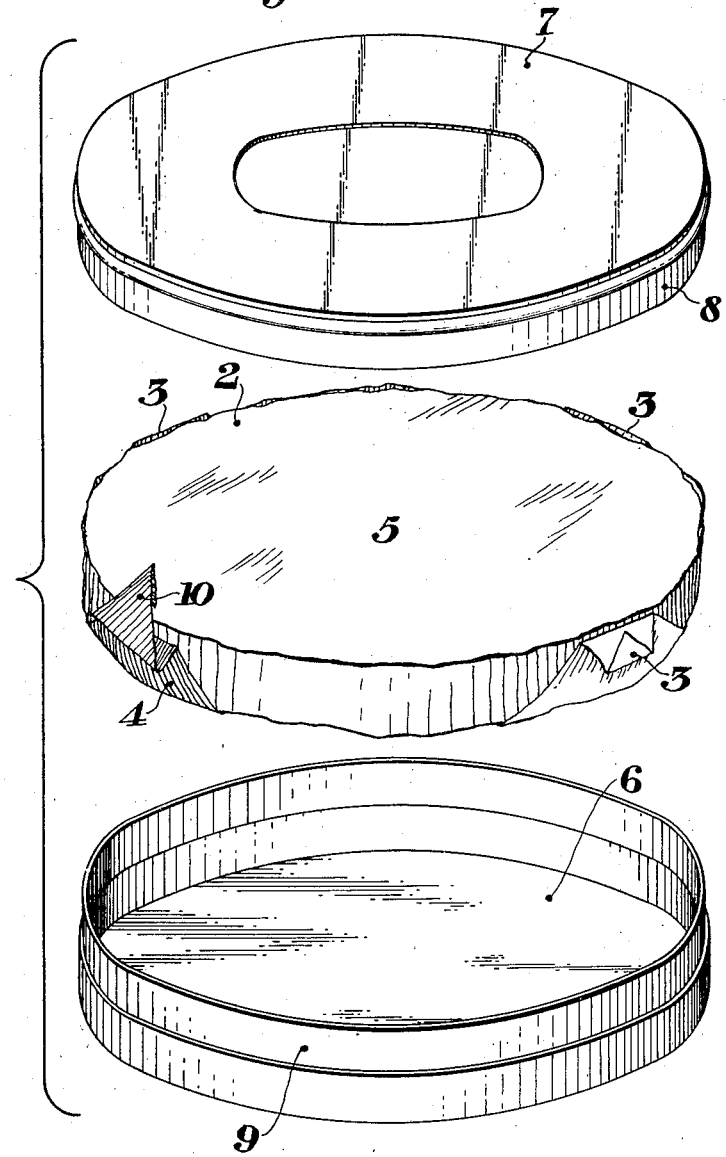
Fig. 1 is a perspective view of the elements of a film package about to be assembled, the film package being constructed in accordance with and embodying a preferred form of my invention.

There are a number of difficulties in packing motion picture film for transportation particularly unexposed light sensitive photographic film. Such film is very susceptible to "friction" marks and to "abrasion" marks such marks are frequently caused by blows striking the film by twisting the convolutions of film more tightly against each other and by other rough handling. Movement of one convolution of a coil relative to the next is liable to damage the light sensitive emulsion in such a manner that freak markings will develop up. Some types of abrasion cause desensitized portions in the film.

Considerable difficulty has also arisen in packing photographic film because some of the standard types of pressboard, corrugated board and other packing materials contain ingredients which chemically fog the film.

My present invention is particularly directed to forming a simple package which will overcome these difficulties.

As indicated in Fig. 1 a preferred form of my invention consists of wrapping a coil of film 1 in a protecting covering 2, said protecting covering preferably being an envelope of different shape from the coil of film. By folding portions of the protecting cover 2 into a series of folds at spaced intervals 3 and 4 in such a manner that the series of folds form shock absorbing members, the film is protected when the package, designated broadly as 5, is inserted into a film can 6. The can itself may be of the usual type having a cover 7, a flange 8 on the cover engaging a cooperating flange 9 on the can body. As also indicated in Fig. 1 the covering 2 is preferably folded in such a manner that at least one corner 10 will project upwardly from the wrapping. This end 10 as best shown in Fig. 2 is adapted to project upwardly beyond the edge of the flange 9 and is adapted to serve as a handle 10 by which the package may be readily removed from the can 6.

This package is quite simple to make and can be readily prepared by a relatively unskilled operator. As indicated in Fig. 3 the coil of film may be, for instance, a 1000 ft. coil of film 1 which is coiled closely about a central core 11. This core may be provided with the usual aperture 12 in the center. The coil is placed into an envelope or wrapping 2 of a different shape from the coil. In the present embodiment the envelope is square and the coil of film 1 is round. When the film has been completely inserted in the envelope 2 the material 13 of the envelope corners is spaced a considerable distance from the periphery 14 of the film coil, while at the medial portions between the corners the film coil substantially fills the envelope. As indicated in Fig. 5 the corners of the envelope 13 are folded back and forth so that a plurality of folds form springy shock absorbing buffer members which press tightly upon the convolutions of film when the package, after it is folded up as in Fig. 5, is inserted into a can body 6. The portions of the envelope between the folded buffer members 3 are spaced normally a slight distance from the flanges 9 of the can so that with the wrapper 2 folded as above described the film coil is resiliently supported at four portions about its periphery by means of the flange 9. Thus a sudden shock or bump on the can is not immediately transferred to the film coil and except in severe cases the film is not damaged at all by a blow on the can. Moreover, the resilient members 3 tend to hold the film convolutions in their initial position in which they lie in close contact.

As indicated in Fig. 6 the shock absorbing buffers 3 may comprise a plurality of layers of material folded back and forth to form a resilient member between the can and the film.

In Fig. 7 the buffer member 4 is indicated, the fold being so made that a handle 10 projects well above the can flange 9. Such a buffer may be made of the same number of folds as the buffer shown in Fig. 6 but the length of these folds are less so that the handle 10 results. In both cases there are a sufficient number of folds of material to adequately protect the coil of film.

It is, of course, possible to make the envelope 2 of any desired material but I prefer to use a good grade of heavy paper free from pin holes, dark in color so as not to transmit light and free from material which will affect the light sensitive photographic emulsion.

It should be noted that after a package of film constructed in accordance with my invention has been opened for the first time, and this is always done in a dark room since the film is light sensitive, the film can be replaced in the envelope 2 and returned to the can 9.

When a can has been opened in the dark the operator can readily feel the handle 10 projecting upwardly from the wrapping 2 and since the paper is tough this handle can be used to pull out the package of film. Of course, after a portion of the film has been used from the coil 1 the package will not fit tightly in the can since the buffer members 3 and 4 will not then necessarily fill all of the space between the film coil and the can flanges. However, this is not particularly important since ordinarily the film is not again shipped until it has been exposed.

While I have shown as a preferred form of my invention a wrapping 2 of different shape from the film coil 1 and this shape is preferably square, obviously any number of corners could be provided as it is only necessary for my invention that certain portions of the wrapping shall be spaced further from the periphery of the film coil than are other portions so that there is material which can be folded into the buffers. I have found that four corners serve the purpose admirably although, of course, a greater or lesser number can be used so long as there is a sufficient number of buffers to space the periphery of the film slightly from the film can flange so that shocks to the can will not be transmitted to the film.

While I have described preferred embodiments of my invention obviously it is also susceptible of other embodiments so I contemplate as within the scope of my invention all such forms as may come within the scope of the appended claims.

Having thus described my invention, what I claim as new and desire to secure by Letters Patent is:

1. In a package for motion picture film, the combination with a coil of film, a protective covering for the film comprising a square envelope with the corners folded into at least two thicknesses to form film protecting buffers, and a round can having a flange against which the folded thickness of the envelope lie to space the coil of film at intervals from the can flange.

2. In a package for motion picture film, the combination with a coil of film, a protective covering for the film comprising a square envelope with the corners folded into at least two thicknesses to form film protecting buffers, and a round can having a flange against which the folded thickness of the envelope lie to space the coil of film at intervals from the can flange, at least one of the corners of the square envelope projecting above the can flange to facilitate the removal of the film.

3. In a package for motion picture film the combination with a round coil of film wrapped in a polygonal envelope, the corners of said envelope being folded, a can for containing the film and envelope, said folded corners positioning the coil of film substantially centrally of the can.

4. In a package for motion picture film the combination with a round coil of film wrapped in a polygonal envelope, the corners of said envelope being folded, a can for containing the film and envelope, said folded corners positioning the coil of film substantially centrally of the case and one of said corners being folded to project from the can.

HOMER J. NELSON.